United States Patent [19]

Hayashi et al.

[11] Patent Number: 5,402,289
[45] Date of Patent: Mar. 28, 1995

[54] TAPE TRAVEL CONTROL MECHANISM

[75] Inventors: Hideki Hayashi; Hideo Miura; Seiichi Funaya; Kouji Seki, all of Toda, Japan

[73] Assignee: Clarion Co., Ltd., Tokyo, Japan

[21] Appl. No.: 996,316

[22] Filed: Dec. 23, 1992

[30] Foreign Application Priority Data

Dec. 26, 1991 [JP] Japan .................. 3-345491
Feb. 20, 1992 [JP] Japan .................. 4-033552

[51] Int. Cl.⁶ .............................................. G11B 5/54
[52] U.S. Cl. ................................................. 360/105
[58] Field of Search ................... 360/105, 96.3, 96.4, 360/74.1, 105, 95, 85

[56] References Cited

U.S. PATENT DOCUMENTS

| | | | |
|---|---|---|---|
| 4,378,578 | 3/1983 | Shiozu et al. | 360/96.3 |
| 4,563,711 | 1/1986 | Takai | 360/74.1 |
| 4,757,403 | 7/1988 | Hiyashi et al. | |
| 5,105,321 | 4/1992 | Hayashi | |

FOREIGN PATENT DOCUMENTS

| | | | |
|---|---|---|---|
| 26337 | 2/1983 | Japan | 360/74.1 |
| 26346 | 2/1983 | Japan | 360/74.1 |
| 58-57820 | 12/1983 | Japan | |
| 83246 | 5/1985 | Japan | 360/74.1 |
| 127554 | 7/1985 | Japan | 360/74.1 |
| 39960 | 2/1986 | Japan | 360/74.1 |
| 03451 | 1/1987 | Japan | 360/74.1 |
| 185861 | 7/1989 | Japan | 360/74.1 |
| 224965 | 9/1989 | Japan | 360/74.1 |

Primary Examiner—Stuart S. Levy
Assistant Examiner—Allen Cao
Attorney, Agent, or Firm—Price, Gess & Ubell

[57] ABSTRACT

A mode plate (5) which moves between a plurality of operational positions controls the respective positions of a head plate (2) and a link (8). The link (8) is turned to a forward and a reverse position to selectively operate pinch roller casings (12F, 12R) through a change link (4). This causes pinch rollers (13F, 13R) to be pressed against capstans (15F, 15R), respectively to thereby provide a forward or reverse play mode tape travel. By the turning of the link (8), an FF/REW plate (27) is moved to a forward and a reverse side through a detect link (9) and a spring (9a) such that FF/REW gears (25F, 25R) supported at the ends of an FF/REW plate (27) engage selectively with reel bases (11F, 11R) to thereby perform tape travel in an FF mode or a REW mode. A head plate (2) controls the positions of pinch roller casings (12F, 12R) and the FF/REW plate (27). At a stop mode position, the head plate (2) holds the pinch roller casings (12F, 12R) and FF/REW plate (27) at the release positions while holding the FF/REW plate (27) at the release position at a play mode position. The head plate (29) causes idler plates (26F, 26R) which support idler gears (24F, 24R) to engage pinch roller casings (12F, 12R) to operate the idler plates (26F, 26R) depending on the operation of the pinch roller casings (12F, 12R) and engages the idler gears (24F, 24R) selectively with reel bases (11F, 11R), respectively.

4 Claims, 11 Drawing Sheets

TAPE TRAVEL CONTROL MECHANISM

BACKGROUND OF THE INVENTION

The present invention relates to magnetic recording and reproducing apparatus which record/reproduce signals such as speech signals to/from a traveling magnetic tape, and more particularly to a mechanism which controls the travel of a tape such as a pinch roller changing mechanism for changing a pinch roller pressed against a capstan to thereby change the direction of tape travel and a fast feed/rewinding mechanism which performs the fast feeding/rewinding operations of a tape.

Recently, tape players of the type which drive a magnetic tape in a forward and a reverse direction have widely sold. A player of this type usually has five modes: stop, play, fast feed (FF), rewinding (REW), and program change. At preset, in order to improve the operability, so-called full-logic compatible type tape players in which a microcomputer incorporated into the player controls those operational modes have been developed and put to practical use.

Conventionally, in such a tape player, a mechanism is provided which controls the position of the head for each mode. In this mechanism, the head is mounted on a plate called a head plate, which is driven, for example, by a motor such that the head plate is held at a position where the head contacts the tape or at a position where the tape moves away from the tape in accordance with the selected mode.

In order to change the direction of tape travel, a mechanism which changes between a take-up side and a supply side and a pinch roller changing mechanism which changes the pitch roller pressed against the capstan are provided. One example of the pinch roller changing mechanism is the technique disclosed in a published unexamined Japanese patent application Sho. 58-57820 (1983). In this technique, an intermittent gear is provided as means which does not interfere with a position control structure for the head plate. The gear has a cutout with successive teeth formed around its inner periphery except at two spaced points and a cam which performs a locking operation at each half rotation. The intermittent gear is combined with a drive gear which is normally rotated in connection with a motor. A solenoid involving a plunger forcedly changes the pinch roller pressed against the capstan when tape travel is changed.

As a fast feed/rewinding mechanism used in a tape player of the type which has modes such as are mentioned above, a mechanism has been proposed in which a microcomputer gives a FF operation command or a REW operation command in accordance with the operation of an FF/REW switch to thereby perform an FF or a REW operation. Generally, this FF/REW mechanism is provided with a drawing solenoid which operates in accordance with a command from the microcomputer. In the FF or REW operation, the drawing solenoid performs a drawing operation such that an FF/REW gear is pressed against a flywheel gear and a reel base to perform the FF or REW operation.

The above-mentioned conventional pinch roller changing mechanism and FF/REW mechanism have the following drawbacks. In the pinch roller changing mechanism and the FF/REW mechanism, means such as a solenoid and an intermittent gear are generally used in order to change the pinch roller and the FF/REW gear when the mode of tape travel is changed. In this case, the solenoid provides an electromagnetic coercive force enough to hold members in a given state with small power consumption, but does not provide an electromagnetic coercive force large enough to drive the members forcedly, so that many members are required which include a spring and other members to provide such a large drive force. Many members are required to be provided around the intermittent gear in order to convert the drive force to an operation in a given direction. As the number of parts increases, the number of steps of assembly is large, so that assembling is complicated and, as a result, the assembly accuracy is reduced and the reliability of the tape travel control mechanism is reduced. The use of many parts and the complication of the mechanism would reduce the degree of freedom of design in a tape player. In addition to such complication of the structure, since the sizes of the solenoid and the intermittent gear themselves are large, large spaces for installation are required. As a result, this is a large hindrance to reduction of the size and weight which are required for the tape player. In addition, the use of many members and the complication of the mechanism increases the total cost of the members.

Therefore, it is required to provide an excellent tape travel control mechanism which uses a small number of parts assembled and is easy to assemble, excellent in the reliability of the mechanism and the degree of freedom of design, contributory to reduction in the size and weight of the overall tape player, and inexpensive.

SUMMARY OF THE INVENTION

The aforementioned problems with the prior art are solved by the present invention. A tape travel control mechanism according to the present invention comprises a fixed member (1), a head plate (2) disposed movably on the fixed member for moving between a first and a second operational position, and a head (3) mounted on the head plate. The head contacts a tape when the head plate is at the first operational position and is away from the tape when the head is at the second operational position.

Disposed over the fixed member are forward and reverse side tape travel means (12F, 12R) which operate so as to travel a tape in the forward and reverse directions, respectively. The forward and reverse side tape travel means are selectively operated by the changing operation of a change member (4) disposed turnably or movably over the fixed member. The change member is selectively positioned at one of the forward and reverse positions by the movement, between the forward and reverse positions, of a link (8) disposed rotatably over the fixed member.

Disposed over the fixed member is a mode plate (5) which moves between a plurality of operational positions to control the positions of the head plate and the link. The mode plate comprises a first control section (6) which controls the position of the head plate in accordance with the operational position of the mode plate and a second control section (7) which controls the position of the link member. Such a mode plate is generally arranged so as to take five mode positions: a stop mode position, two FF/REW mode positions, a forward play mode position, and a reverse play mode position. The number of mode positions and kinds of the mode plate can be suitably selected when required. While the second control section is generally arranged such that the link is held at a neutral position between the forward and reverse positions in the stop mode, it may be arranged such that the second control section holds the link at any one of the forward and reverse positions.

In the typical embodiment of the present invention, a change link (4) is attached rotatably as a change member on the head plate (2). The change link (4) is selectively engaged with the link (8) in response to the operation of the head plate (2) to be driven to a position corresponding to that of the link member (8) and any one of pinch roller casings (12F, 12R) is moved to a release side where the pinch rollers (13F, 13R) move away from the corresponding capstans (15F,15R). Disposed between the pinch roller casings (12F, 12R) is a biasing member 14 which biases the pinch roller casings on both its sides toward abutting sides where the pinch rollers (13F, 13R) abut on the capstans (15F, 15R). Disposed in the head plate (2) are third control sections (2a) engaging the pinch roller casings (12F, 12R) on both its sides, so that the head plate (2) moves the pinch roller casings (12F, 12R) on both its sides to the release side against the action of the biasing member (14) in the course of movement to the second operational position and is driven to the first operational position by the biasing force of the biasing member (14). The head plate (2) is also held at a third operational position between the first and second operational positions to hold the pinch rollers (12F, 12R) on both its sides on the release side.

In this embodiment, an FF/REW plate (27) is disposed so as to reciprocate linearly. The FF/REW plate (27) is engaged with the link (8) through a spring (9a) and a detect link (9) such that the FF/REW plate (27) is selectively moved to one of the forward and reverse positions in accordance with the action of the link (8) to thereby engage any one of a pair of FF/REW gears (25F, 25R) provided on the corresponding opposite ends of the plate (27) with a reel gear of a reel base (11F or 11R). In this case, the operation of the FF/REW plate (27) is controlled by the operational position of the head plate (2). When the head plate (2) is at the first and second operational positions, the FF/RFEW plate (27) is held at the neutral position between the forward and reverse positions where the FF/REW gear is not engaged with the reel gear. When the head plate (2) is at a third position between the first and second operational positions, the FF/RFEW plate (27) is movable to the forward or reverse position. Only when the head plate (2) is at the first operational position, can FF/REW plate (27) be arranged so as to be held at a position where the FF/REW gear is not engaged with the reel gear.

In the tape travel control mechanism having the above structure, the mode plate (5) is at a stop mode position, for example, in the stop mode. In this case, the head plate (2) is at the second operational position where the head is spaced from the tape, and the pinch rollers (12F, 12R) on both its sides are held by the head plate on the releasing side. In such a stop mode, the link (8) is generally at the neutral position between the forward and reverse positions and thus change members such as the change link (4) and the FF/REW plate (27) are also at the neutral position between the forward and reverse positions.

When the mode is thus changed from such, the mode is changed to the forward play mode, and the mode plate (5) moves from the stop mode position to the forward play mode position. The head plate (2) then moves from the second operational position to the first operational position by the biasing force of the biasing member (14) in accordance with the operation of the mode plate (5). By the movement of this head plate (2), the pinch roller casings (12F, 12R) on both its sides are enabled to turn toward the abutting side and the change link (4) becomes engageable with the link member (8). In this case, the link (8) is moved by the operation of the mode plate (5) from the neutral position to the forward position. By the operation of the link member (8), the change link (4) turns from the neutral position to the forward position, the pinch roller casing (12F) on the forward side is moved to the abutting side by the biasing force of the biasing member (14), and the pinch roller casing (12R) on the reverse side is held on the releasing side by the operation of the change link (4) In this state the FF/REW plate (27) is held at the neutral position by the head plate as in the stop mode.

When the mode is changed from the forward play mode to the reverse play mode, the mode plate (5) moves from the forward play mode position to the reverse play mode position. The link (8) moves from the forward position to the reverse position in accordance with the operation of the mode plate (5). By the operation of the link (8), the change link (4) is turned from the forward position to the reverse position, the pinch roller casing (12F) on the forward side moves from the abutting side to the releasing side, and the pinch roller casing (12F) on the reverse side moves from the releasing side to the abutting side. In the change of travel for the play mode, the head plate (2) is held at the first operational position during the changing operation from a standpoint of minimization of the time required for such change.

For example, when the mode is changed from the forward play mode to the FF mode, the mode plate (5) moves to the corresponding one of the two FF/REW positions. The head plate (2) moves from the first operational position to the third operational position in accordance with the operation of the mode plate (5), and the pinch roller casings (12F, 12R) on both its sides move toward the releasing side. The link (8) moves temporarily from the forward position to the neutral position in accordance with the operation of the mode plate (5) and moves again through the neutral position (or through the neutral position and the reverse position) to the forward position. Since in this case the head plate (2) moves to the third operational position, the FF/REW plate (27) is released from the head plate and moves from the neural position to the forward position by the operation of the link member (8).

When the mode is changed from such FF mode to the REW mode, the mode plate (5) moves toward the remaining one of the two FF/REW positions. The link member (8) moves from the forward position to the reverse position in accordance with this operation of the mode plate. By this operation of the link (8), the FF/REW plate (27) moves from the forward position to the reverse position. In such change of the FF/REW mode, the head plate (2) is generally held at the third operational position during the changing operation from a standpoint of minimization of the changing time.

As described above, in the inventive tape travel control mechanism, the position of the head plate can be controlled by the drive force of the mode plate as well as the abutting, releasing and changing operations of the pinch roller relative to the capstan, or the meshing, releasing and changing operations of the FF/REW gears can easily be controlled and performed by a greatly simplified structure composed of a small number of parts. Thus, a large-sized complicated mechanism using a solenoid and an intermittent gear is not required to be used. Therefore, the inventive tape travel control mechanism is easy to assemble, high in the degree of freedom of design, and contributory to reduction in the size and weight of the overall tape player, and the cost and results in high practicality.

BRIEF DESCRIPTION OF THE DRAWINGS

FIG. 1 shows a stop mode;

FIG. 2 shows a neutral state in a play mode;

FIG. 3 shows a forward play mode;

FIG. 4 shows a reverse play mode;

FIG. 5 shows a FF mode in a forward play;

FIG. 6 shows a REW mode in a forward play.

FIG. 7 shows a deck plate 1;

FIG. 8 shows a head plate 2;

FIG. 9 shows a change link 4;

FIG. 10 shows a play link 8;

FIG. 11 shows a mode plate 5;

FIG. 12 shows a FF/REW plate 27; and

In these Figures, bracketed numerals show the positions of attachment of other parts.

DETAILED DESCRIPTION

Figure 1:
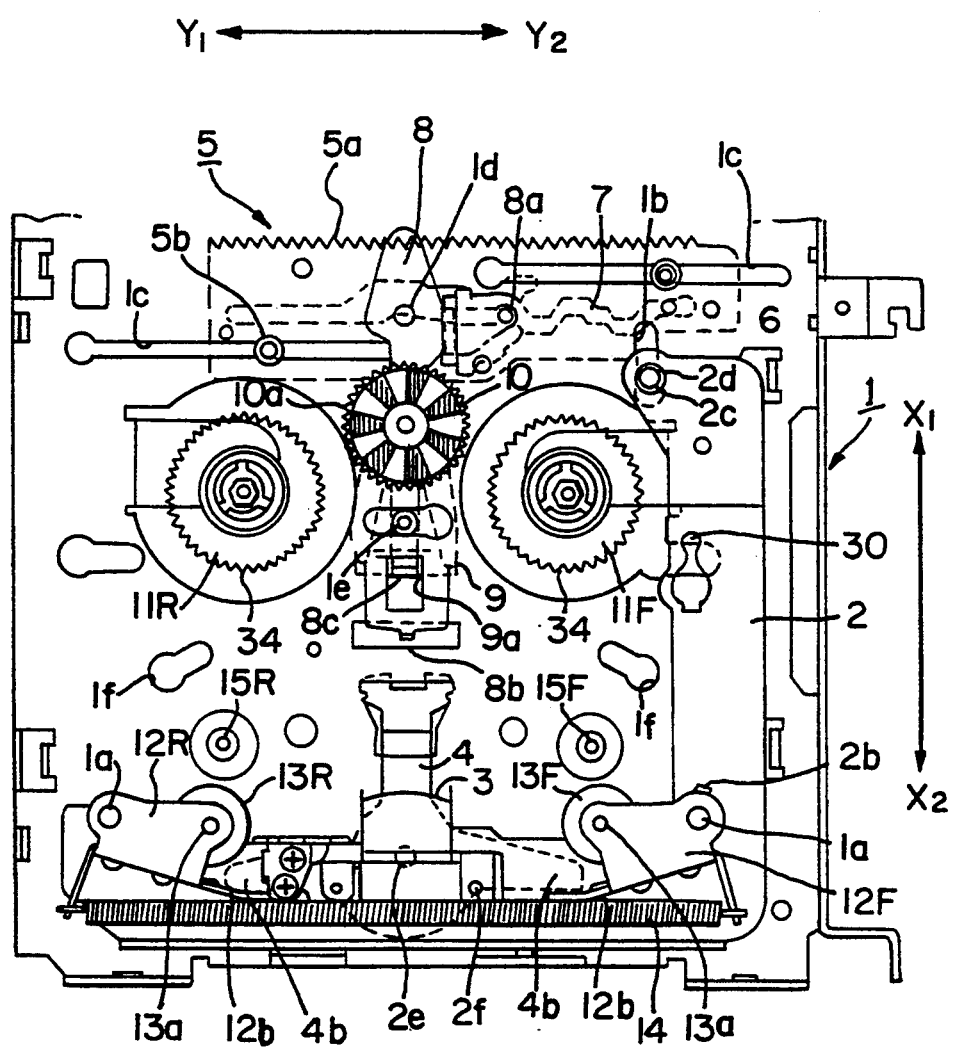
FIGS. 1-4 is a plan view of a typical embodiment of a tape player to which the inventive tape travel control mechanism is applied.
Figure 2:
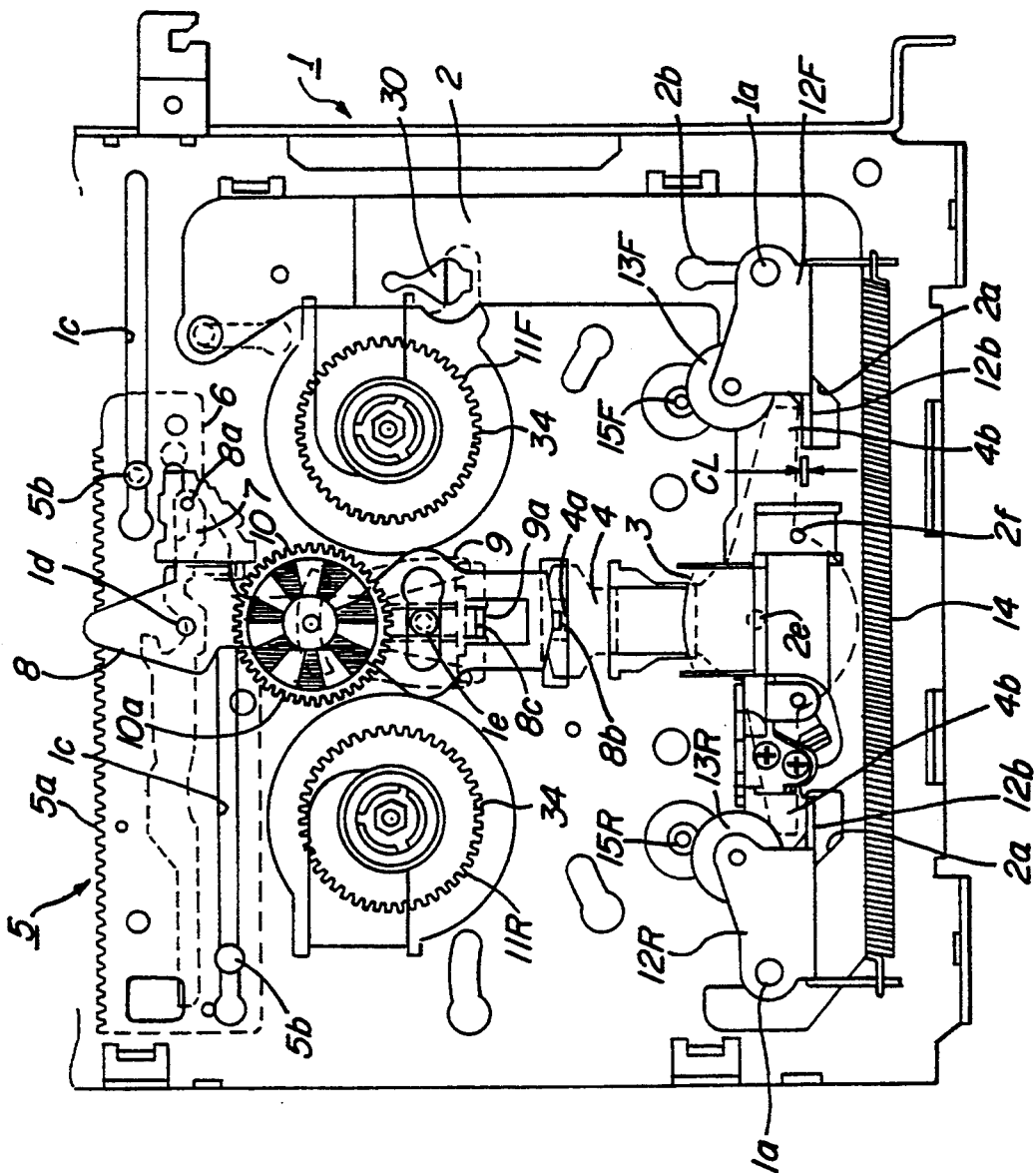
Figure 3:
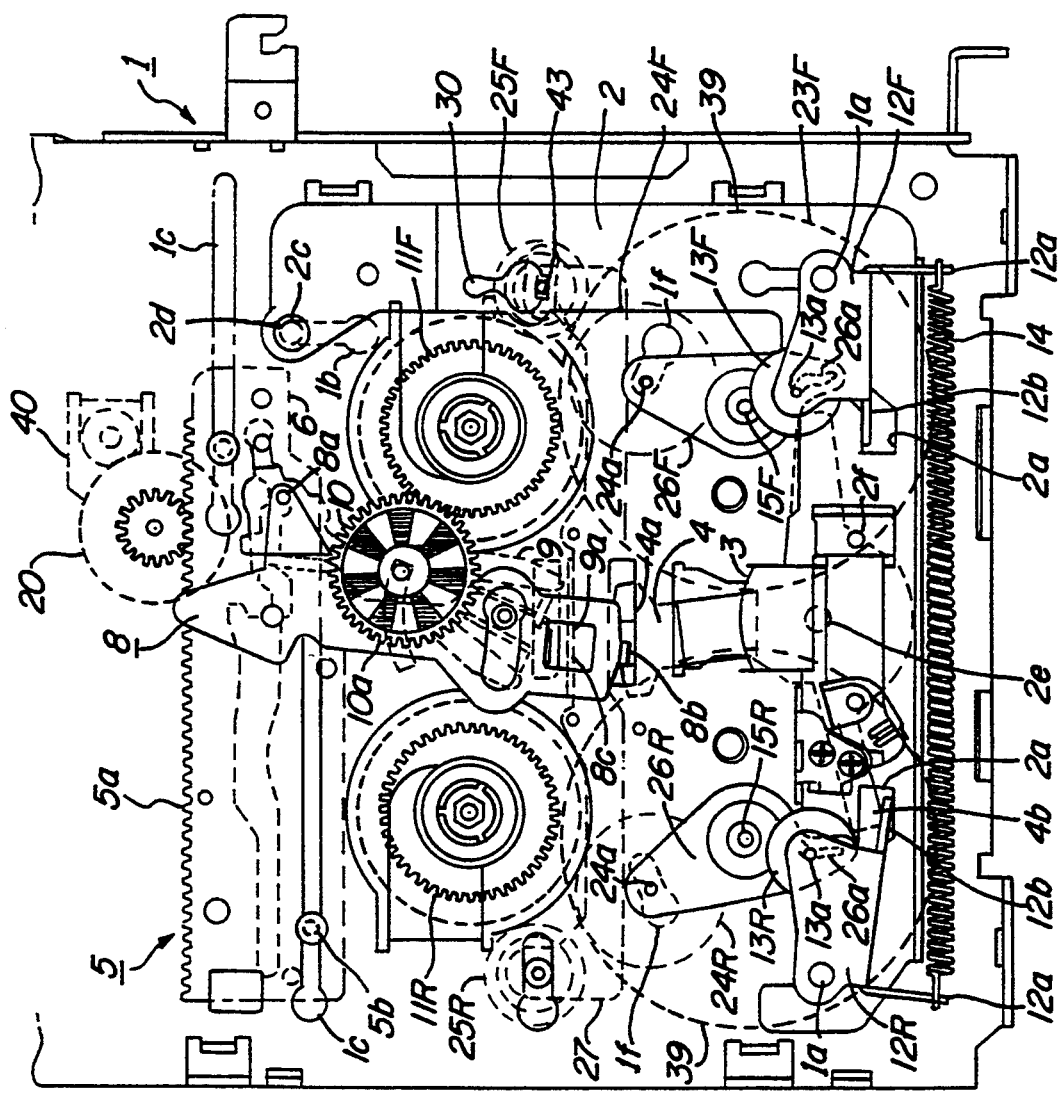

Referring to FIGS. 1-3, one preferred embodiment of a tape travel control mechanism according to the present invention will be described.

Structure of the Tape Travel Control Mechanism

The present embodiment is directed to a mechanism used in a tape player which is controlled by a microcomputer. This mechanism is provided as main components with a head plate 2, a change link 4, a mode plate 5, a play link 8, a pair of pinch rollers 12F, 12R, and an FF/REW plate 27 on an upper or a lower surface of a deck plate 12.

This tape travel control mechanism will be outlined below. In the description, the elements provided on the upper surface of the deck plate 1 will first be described and those provided on the lower surface of the deck plate will then be described.

Elements Provided on the Upper Surface of the Deck Plate (FIGS. 1-6, FIG. 13)

Disposed on the upper surface of the deck plate 1, as shown in FIG. 3, are the head plate 2, a pair of reel bases 11F, 11R, the change link 4, the play link 8, a pair of capstans 15F, 15R, a pair of idler plates 26F, 26R, and the pair of pinch roller casings 12F, 12R.

Head Plate (FIGS. 1-6, 8)

As shown in FIG. 1, the head plate 2 is attached on the upper surface of the deck plate 1 (see FIG. 7) so as to be movable forward and backward (directions X1 and X2, respectively, in FIG. 1). The head plate 2 takes the form of a substantially L-like configuration made of a first right-left (in direction Y1-Y2 in FIG. 1) long plate portion at a rear (direction X2) end of the deck plate 1 and a second plate portion extending forward (direction X1) from and perpendicular to a right-hand (direction Y2) end of the first plate portion.

Figure 8:
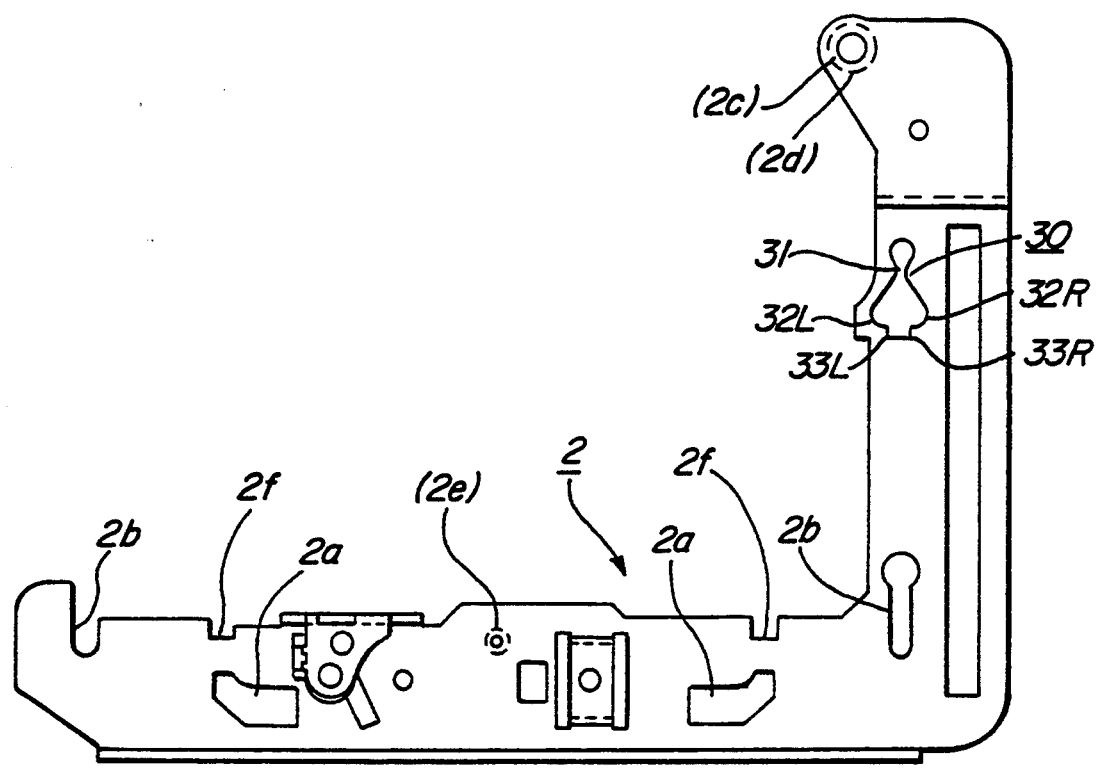

Referring to FIG. 8, a head 3 (not shown in FIG. 8) is mounted at the center of the first plate portion of the head plate 2. The first plate portion is provided with a cam hole 2a on each side of the head 3. Disposed in each of the left-hand (direction Y1) end of the first plate portion of the head plate 2 and the L-like bend is a forward-backward extending groove 2b into which a corresponding one of a pair of guide pins provided on the deck plate 2 is inserted. Disposed on the front end of the second plate portion of the head plate 2 are a guide pin 2c and a cam follower 2d coaxial with the guide pin 2c, which is inserted into a forward-backward extending guide groove 1b provided in the deck plate 1.

The head plate 2 moves between a backward stop mode position (regress position) of FIG. 1 and a forward play mode position (progress position) of FIG. 2 while being guided back and forth on the deck plate 1 by the three guide pins 1a, 2c and the three grooves 1b, 2b. The head plate 2 is held by the mode plate 5, to be described in more detail later, at the stop mode position (regress position) and the play mode position (progress position) and also at the FF/REW mode position slightly behind the play mode position. Provided at substantially the center of the forward edge of the first plate portion of the head plate 2 is a downward protruding support shaft 2e for attaching to the first plate portion the change link 4 to be described in more detail later. The head plate 2 is provided with recesses 2f on the forward edge of the first plate portion of the head plate 2 in the vicinity of the corresponding cam holes 2a in order to enable the operation of the engagement pins 13a of the pinch roller casings 12F, to be described in more detail later, on the head plate 2.

A control hole 30 which controls the position of the FF/REW plate 27 is provided at the center of the second plate portion of the head plate 2. The control hole 30 has the configuration of a vase with a forward narrowest bottle-neck portion 31, a most expanded middle barrel portion 32 and a rear end as a base 33. In this case, the barrel portion 32 is defined by a left edge 32L and a right edge 32R while the rear end 33 is defined by a left edge 33L and a right edge 33R.

Reel Base (FIGS. 1-7 and FIG. 13)

Figure 7:
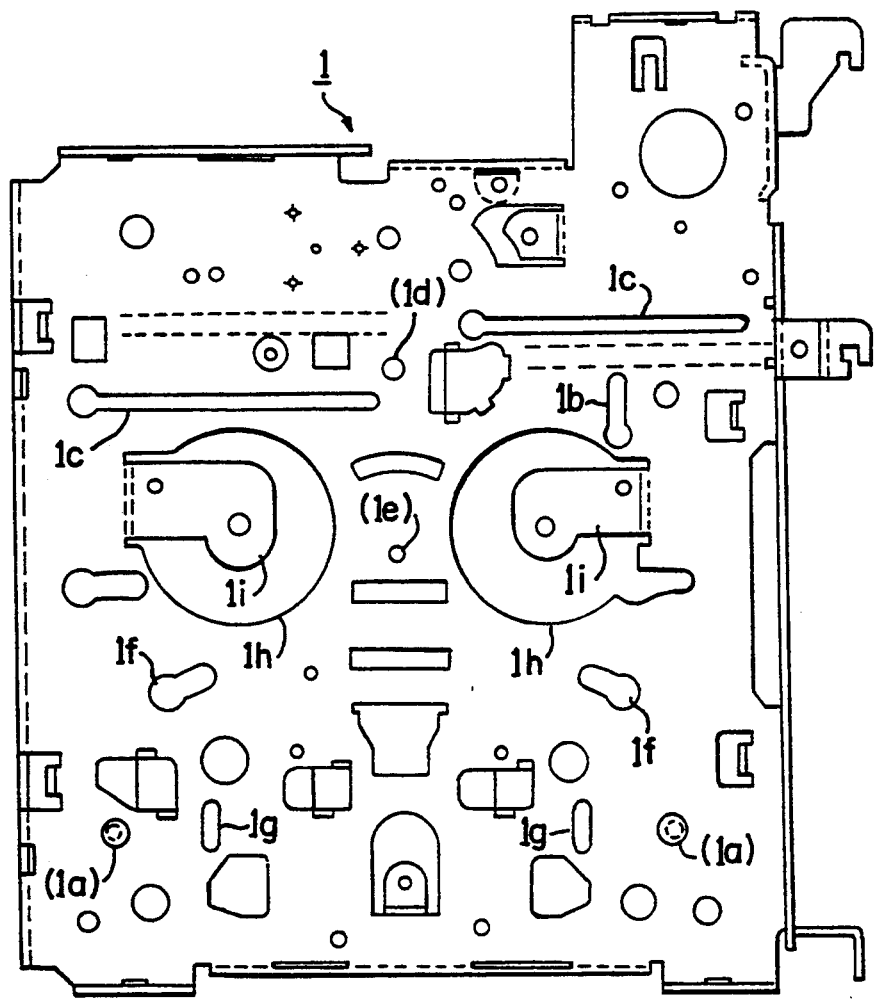
FIGS. 7-12 are each a plan view of a respective one of the components of the tape player.

As shown in FIG. 7, at the center of deck plate 1 is a pair of attachment holes 1h into which a corresponding pair of opposing attachment members 1i extends from the respective opposite inner edges of the holes 1h. The attachment members 1i are horizontally disposed slightly below a surface of the deck plate 1 where the holes 1h are provided. A pair of reel bases 11F, 11R is provided rotatably at a corresponding pair of positions one corresponding to each of the centers of the attachment holes 1h, as shown in FIG. 13.

Figure 13:
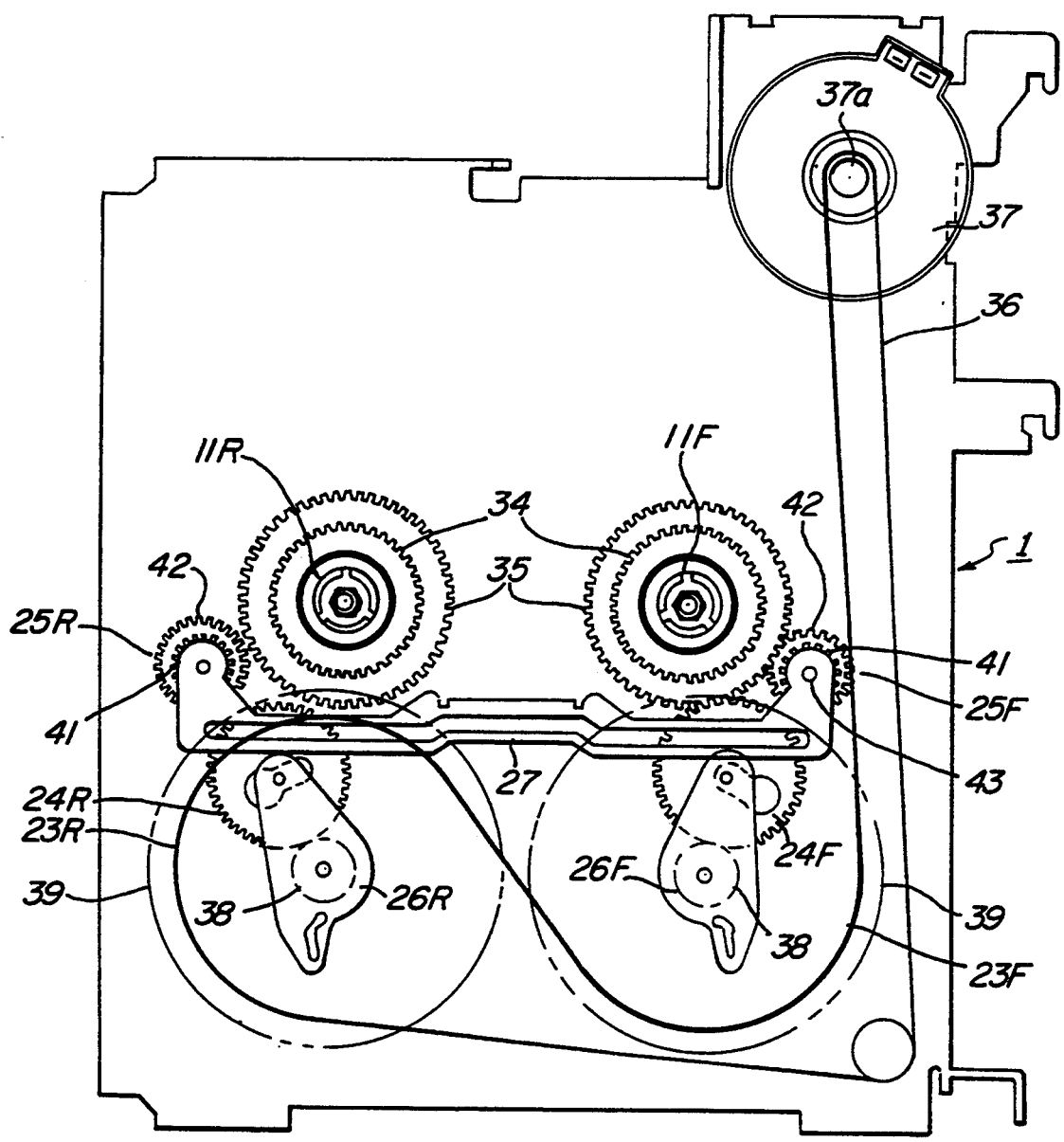
FIG. 13 is a plan view of a drive force transmitting system of the embodiment.

As shown in FIG. 13, the reel bases 11F, 11R are each formed as a larger diameter gear 35 integral therewith. The reel bases 11F, 11R also have gears 34 having a smaller diameter coaxial with the corresponding gears 35 on lower surfaces of the reel bases 11F, 11R. As described above, since the attachment pieces 1i are provided below the corresponding attachment holes 1h, the large diameter gears 35 and the smaller diameter gears 34 appear partially below the lower surface of the deck plate 1.

Change Link (FIGS. 1-4, FIG. 9)

As shown in FIG. 1, the change link 4 has three outward arms and is attached rotatably by a support shaft 2e to a lower surface of the first plate portion of the head plate 2. Thus, the change link 4 moves back and forth following the back and forth movement of the head plate 2 and is turned around a neutral position of FIGS. 1 and 2 between a forward play mode position (a counterclockwise position) of FIG. 3 and a reverse play mode position (a clockwise position) of FIG. 4. The change link 4 has a forward extending arm whose end has an engagement recess 4a and extends downward through the deck plate 1.

Figure 9:
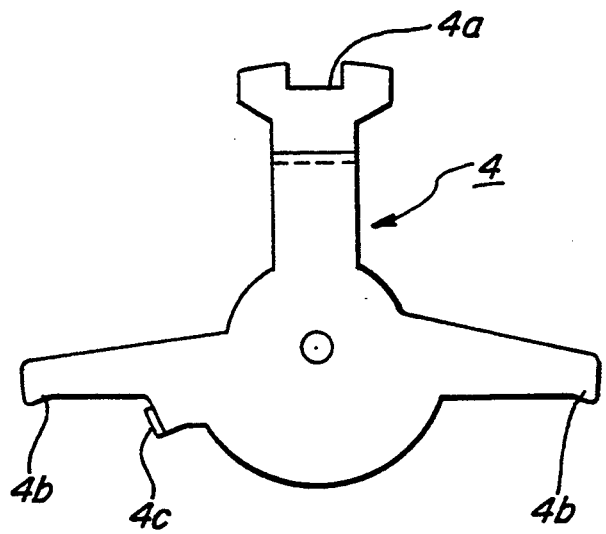

As shown in FIG. 9, the right and left arms are each provided with a rear engagement end edge 4b which is engageable with a corresponding one of the pinch roller casings 12F, 12R to be described in more detail later. In FIG. 9, reference character 4c denotes an engagement protrusion engageable with an operating member (not shown) in order to change another tape travel means (not shown).

Play Link (FIGS. 1–6, FIG. 10)

As shown in FIG. 1, the play link 8 is a forward-backward long member disposed at the center of the upper surface of the deck plate 1 between the reel bases 11F and 11R before the change link 4. The play link 8 is attached turnably to the deck plate 1 by a support shaft 1d.

Figure 10:
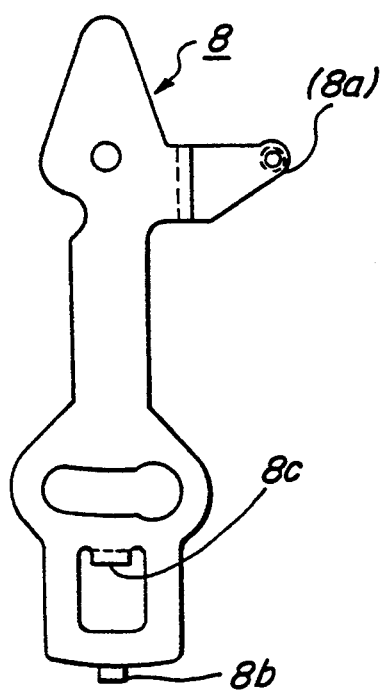

As shown in FIG. 10, the play link 8 has a rightward extending arm in the vicinity of the support shaft 1d. The arm end is provided with a downward protruding cam follower 8a, which is engaged with the mode plate 5 to thereby act so as to turn the play link 8 in accordance with the action of the mode plate 5. In this case, the play link 8 turns between the forward position (clockwise position) of FIG. 3 and the reverse position (counterclockwise position) of FIG. 4 around the neutral position of FIGS. 1 and 2.

Provided down at the rear end and center of the play link 8 are a first engagement portion 8b and a second engagement portion 8c, respectively. The first engagement portion 8b is engaged with and disengaged from an engagement recess 4a in the change link 4 when the head plate 2 moves. The second engagement portion 8c engages a spring 9a of a detect link 9 to be described in more detail later.

Capstan and Idler Plate (FIGS. 1–4 and 13)

As shown in FIG. 1, a pair of upward protruding capstans 15F, 15R is provided rotatably on an upper surface of the deck plate 1. The lower end portions of the capstans 15F, 15R extend downward through the deck plate 1 to appear on the back side of the deck plate. As shown in FIG. 3, a pair of idler plates 26F, 26R is provided to the deck plate 1 such that the idler plates are turnable around the corresponding support shafts coaxial with the capstans 15F, 15R. Substantially L-like cam holes 26a are provided after the corresponding idler plates 26F, 26R.

Pinch Roller Casings (FIGS. 1–4)

As shown in FIG. 1, a pair of pinch roller casings 12F, 12R is disposed one at each of the ends of the first plate portion of the head plate 2. These pinch roller casings 12F, 12R are provided turnably by the corresponding support shafts 1a on the deck plate 1. The pinch rollers 13F, 13R are provided rotatably through the corresponding rotational shafts at opposite inner ends of the pinch roller casings 12F, 12R.

Provided in the vicinity of the support shafts 1a in the pinch roller casings 12F, 12R are backward protruding spring attachment members 12a across which a press spring 14 is provided. The action force of the press spring 14 acts such that the pinch roller casings 12F, 12R turn forward or in the press direction to thereby press the pinch rollers 13F, 13R against the corresponding capstans 15F, 15R.

Provided in the vicinity of the pinch rollers 13F, 13R in the pinch roller casings 12F, 12R are engagement protrusions 12b which are engaged by the action force of the press spring 14 with the cam holes 1a in the head plate 2 and the corresponding engagement edges 4b of the arms of the change link 4.

The action force of the press spring 14 is transmitted as a drive force to the progress position of the head plate 2 to the head plate 2 through the engagement of the engagement protrusions 12b on the pinch roller casings 12F, 12R with the cam holes 2a in the head plate 2. In such engaging relationship, the pinch rollers 13F, 13R move from the progress press positions corresponding to the play mode positions of the head plate 2 and where the pinch rollers 13F, 13R are pressed against the corresponding capstans 15F, 15R to the backward accommodation releasing position where corresponding to the stop mode position (regress position) of the head plate 2 and the pinch rollers are relatively greatly disengaged from the capstans 15F, 15R, respectively. When the head plate 2 is at the FF/RFEW mode position or is engaged with the change link 4, the pinch roller casings 12F, 12R are held at a standby side releasing position where the pinch rollers 13F, 13R are spaced slightly from the capstans 15F, 15R, respectively.

As shown in FIG. 2, a predetermined clearance CL is provided between the cam holes 2a in the head plate 2 and the respective engagement protrusions 12b on the pinch roller casings 12F, 12R when the head plate 2 is at the play mode position (progress position). The clearance CL absorbs dimensional errors so as to securely press the pinch rollers 13F, 13R against the capstans 15F, 15R, respectively.

The pinch roller casings 12F, 12R are provided with downward protruding engagement pins 13a coaxial with the rotational shafts of the pinch rollers 13F, 13R, respectively. The engagement pins 13a are inserted into the cam holes 26a in the idler plates 26F, 26R and control the corresponding positions of the idler plates 26F, 26R in response to the actions of the pinch roller casings 12F, 12R. The engagement pins 13a are provided so as to extend through the notches 2f on the head plate 2 and the forward-backward extending through holes 1g provided at points on the deck plate 1 corresponding to the positions of the notches 2f. By this arrangement, the engagement pins 13a are operable on the head plate 2 and the deck plate 1.

Members Provided On the Lower Surface Of the Deck Plate (FIGS. 1–6, 13)

Provided on the lower surface of the deck plate as shown in FIG. 3 are the mode plate 5, detect link 9, a pair of flywheels 23F, 23R, a FF/REW plate 27, and a pair of idler gears 24F, 24R.

Mode Plate (FIGS. 1–6, 11)

Figure 4:
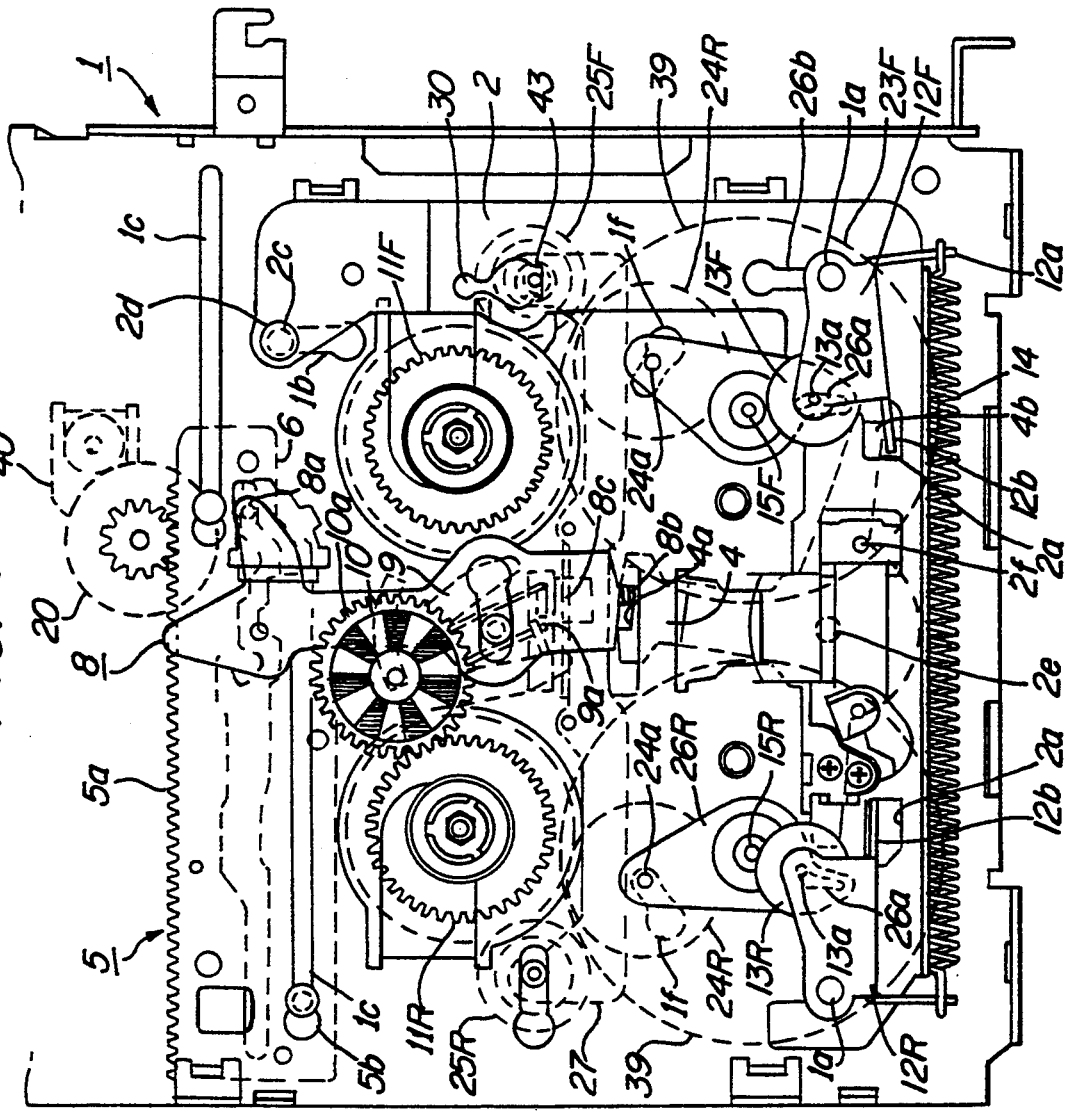
Figure 11:
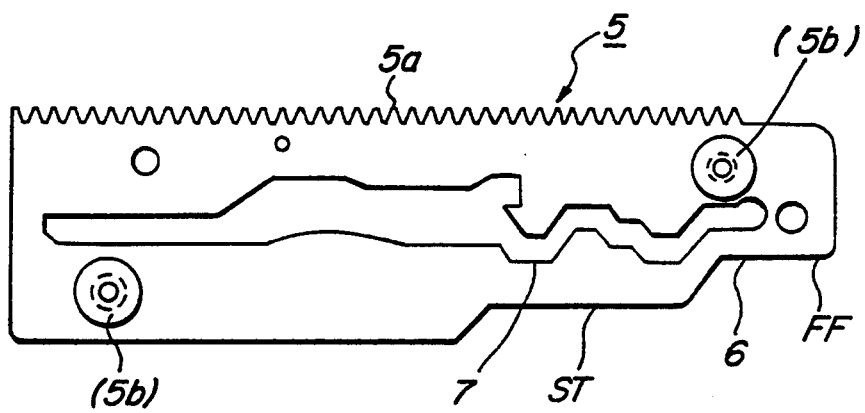
Figure 12:
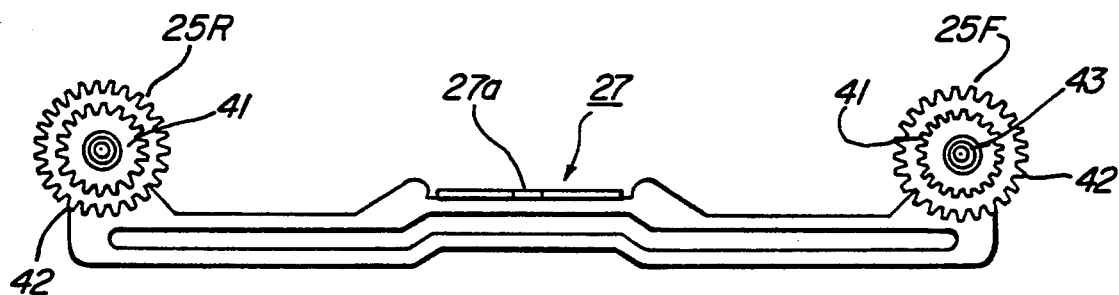

As shown in FIG. 1, the mode plate 5 is a right-left long member disposed forward below the lower surface of the deck plate 1 and attached movably in the right-left direction. The mode plate 5 is provided with a long rack 5a on the forward edge thereof. As shown in FIGS. 3 and 4, the rack 5a meshes with a power gear 20 attached to the moving motor 40. As shown in FIG. 11, the mode plate 5 is provided with a guide pin 5b at each of the right and left ends thereof. The guide pins 5b are inserted into the corresponding right-left extending guide grooves 1c in the deck plate 1.

Figure 5:
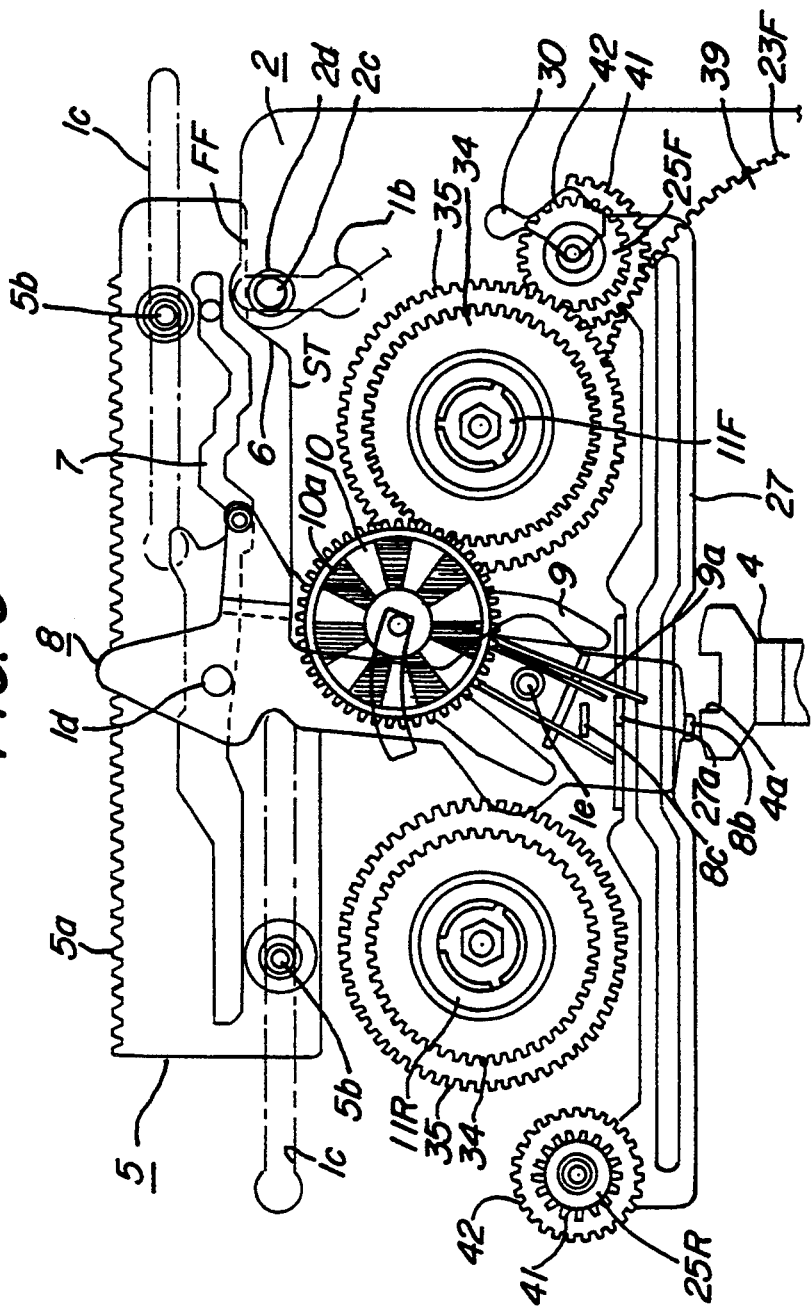
FIGS. 5 and 6 are an enlarged view of the essential portion of the embodiment.
Figure 6:
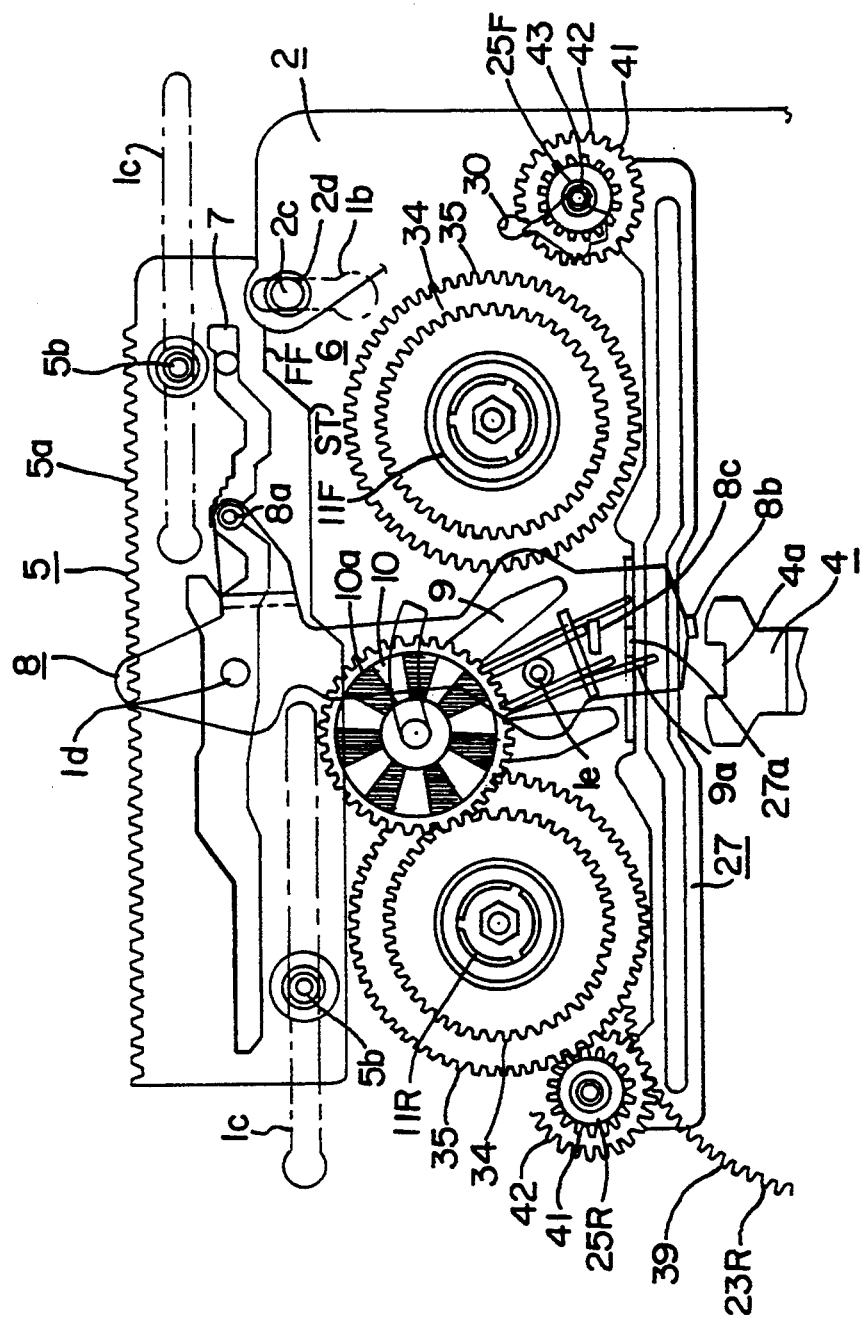

By such engaging relationship, the mode plate 5 is driven by the moving motor 40 to move right and left to thereby take five mode positions: the rightmost stop mode position of FIG. 1, a first FF/RW mode position of FIG. 5, a second FF/RW mode position of FIG. 6, a forward play mode position of FIG. 3, and the leftmost reverse play mode position of FIG. 4.

As shown in FIG. 11, the mode plate 5 has at its rear edge a cam 6 which abuts on a cam follower 2d of the head plate 2 to control the back and forth movement of the head plate 2. The cam 6 is composed of a rear step cam portion ST and a forward step cam portion FF. The rear step cam portion ST controls the head plate 2 to the stop mode position (regress position), while the forward step cam portion FF controls the head plate 2 to the FF/REW mode position. Formed at the center of the mode plate 5 is a main cam 7 having the form of a substantially W-like cutout which receives the cam follower 8a of the play link 8 to control the turning of the play link 8.

Mode Switch and Sensor

A bottom plate (not shown) covering the back of the deck plate 1 is attached relative to the deck plate and provided thereon with a mode switch and a sensor such as a photosensor connected to a microcomputer (not shown) in the vicinity of a position corresponding to that of the mode plate 5. The mode switch senses the position of the mode plate 5 and sends a corresponding signal to the microcomputer. The sensor senses the travelling state of a tape such as a tape end and sends a corresponding signal to the microcomputer. The microcomputer receives those signals to drive and stop the moving motor 40 and a drive motor 37, which will be described in more detail later.

Detect Link (FIGS. 1-8)

As shown in FIG. 1, the detect link 9 is disposed on a lower surface of the play link 8 on the deck plate 1 and attached turnably to the deck plate 1 by a support shaft 1e provided on the deck plate 1. A detect gear 10 is supported turnably on the forward end of the detect link 9, while a U-like spring 9a with an open rear end is provided at the rear end of the detect link 9. The spring 9a is engaged with a second engagement portion 8c of the play link 8 and the FF/REW plate 27 such that the turning of the play link 8 is transmitted to the detect link 9 and the FF/REW plate 27.

The detect link 9 turns in the same direction as the play link 8, depending on the turning of the play link 8, to thereby engage the detect gear 10 with one of the small diameter gears 34 of the reel bases 11F, 11R in order to transmit the torque of the reel base concerned to the detect gear 10. Such detect gear 10 has a sensor reactor 10a on the back thereof.

Flywheel (FIGS. 3, 4, 13)

As shown in FIGS. 3 and 4, a pair of flywheels 23F, 23R is provided turnably on the back of the deck plate 1 and fixedly supports the lower ends of the corresponding pair of capstans 15F, 15R, so that as the flywheels 23F, 23R rotate, the respective capstans 15F, 15R rotate as a unit along with the flywheels. As shown in FIG. 13, each of the flywheels 23F, 23R has an upper portion formed as a larger diameter gear 39. Each flywheel 23R or 23F and a corresponding smaller diameter gear 38 are coaxially provided fixedly on a rotational shaft. The flywheels 23F, 23R each have a groove along the outer lower periphery thereof with a belt 36 extending in common through those grooves around the flywheels 23F, 23R. The flywheels 23F, 23R are coupled through the belt 36 to a drive shaft 37a of the drive motor 37 attached to the back of the deck plate 1.

FF/REW PLATE (FIGS. 5, 6, 12, 13)

As shown in FIG. 5, a right-left long FF/REW plate 27 is disposed at a position corresponding to a rear end of the play link 8 on the back side of the deck plate 1. A pair of FF/REW gears 25F, 25R is attached turnably one to each of the ends of the FF/REW plate 27. Each of the FF/REW gears 25F, is composed of an upper smaller diameter gear 41 and a lower larger diameter gear 42. The smaller diameter gear 41 and the larger diameter gear 42 composing one FF/REW gear 25F are engaged/disengaged with/from the larger diameter gear 33 on the reel base 11F side and the larger diameter gear 39 of the flywheel 23F, respectively, while the smaller diameter gear 41 and the larger diameter gear 42 composing the other FF/REW gear 25R are engaged/disengaged with/from the larger diameter gear 35 on the reel base 11R and the larger diameter gear 39 of the flywheel 23R, respectively.

A protrusion 27a which engages the spring 9 of the detect spring 9 is provided at the center of the FF/REW plate 27, which moves right and left through the spring 9a depending on the direction of turning of the detect link 9. An upward protruding control pin 43 coaxial with the rotational shaft of the FF/REW gear 25F is provided on the FF/REW plate 27. The control pins 43 extends, through the attaching hole 1h in which the reel base 11F is attached, into the control hole 30 in the head plate 2. The control pin 43 moves in the control hole 30 in the head plate 2, depending on the backward and forward movements of the head plate 2, and the position of the control pin 43 is restricted by the forward end 31, the central portion 32 and rear end 33 of the control hole 30, so that the right and left movements of the FF/REW plate 27 are controlled depending on the position of the head plate 2.

Idler Gear (FIGS. 5, 6, 12, 13)

As shown in FIG. 5, play travel idler gears 24F, 24R are provided rotatably through the rotational shafts 24a on corresponding forward lower surfaces of the pair of idler plates 26F, 26R. The rotational shaft 24a are disposed so as to extend through the through holes if provided in the deck plate 1 so as to be movable relative to the deck plate 1. The idler gear 24F meshes with the smaller diameter gear 39 of the flywheel 23F while the idler gear 24R meshes with the smaller diameter gear 39 of the flywheel 23R. The idler gear 24F moves in accordance with the turning of the idler plate 26F to engage with/disengage from the larger diameter gear 35 of the reel base 11F while the idler gear 24R moves in accordance with the turning of the idler plate 26R to engage with/disengage from the larger diameter gear 35 of the reel base 11R.

Operation of the Tape Travel Control Mechanism

The operation of the tape travel control mechanism of the present embodiment will be described below.

Stop Mode (FIG. 1)

As shown in FIG. 1, in the stop mode, the mode plate 5 is at the rightmost stop mode position. Therefore, the rear step ST of the cam 6 abuts on the cam follower 2d to control the base plate 2 at the stop mode position (regress position). The main cam 7 controls the play link 8 at the neutral position through the cam follower 8a. Therefore, the detect link 9 and FF/REWA plate 27 engaged with the play link 8 through the spring 9a are also controlled to the neutral position. At this time, the detect gear 10 is not engaged with any of the smaller diameter gears 34 of the reel base 11F, 11R. The control pin 43 of the FF/REW plate 27 is at the forward end 31 of the control hole 30 in the head plate 2 while the smaller diameter gears 41 and the larger diameter gears 42 constituting the respective FF/REW gear 25F, 25R at the ends of the FF/REW plate 27 are spaced from the larger diameter gears 33 of the reel bases 11F, 11R and the larger diameter gears 39 of the flywheel 23F, 23R, respectively.

In this state, the respective engagement protrusions 12b of the pinch roller casings 12F, 12R are restricted backward by the cam hole 2a in the head plate 2 controlled to the stop mode position (regress position). Therefore, the pinch roller casings 12F, 12R are controlled to the backward accommodation side releasing position so that the pinch rollers 13F, 13R are also held spaced from the corresponding capstans 15F, 15R.

Since the pinch roller casings 12F, 12R are controlled to the backward accommodation releasing position as just described above, the engagement pins 13a of the pinch roller casings 12F, 12R are respectively positioned on the side of the rear ends of the cam holes 26a of the idler plates 26F, 26R, which are put in an outward turned state. Therefore, the idler gears 24F, 24R attached to the idler plates 26F, 26R are released from the larger diameter gears 35 of the reel bases 11F, 11R, respectively.

In the above state, the action force of the press spring 14 acts as a force which presses the head plate 2 forward through the engagement of the engagement protrusions 12b of the pinch roller casings 12F, 12R with the corresponding cam holes 2a in the head plate 2. The engagement recesses 4a and engagement portions 4b of the change link 4 are not engaged with the play link 8 and pinch roller casings 12F, 12R.

Forward Play Mode (FIG. 3)

In the stop mode of FIG. 1, when the microcomputer gives a forward play command, the moving motor 40 starts up to rotate the power gear 20 clockwise, and the mode plate 5 moves through the rack 5a from the stop mode position of FIG. 1 to the left-hand forward play mode position. At this time, the action force of the press spring 14 acts as a drive force which drives the head plate 2 forward, so that the head plate 2 advances along the configuration of the cam 6. The cam follower 2d of the head plate 2 is moved away from the forward edge FF of the cam 6 and completely from the cam 6, at which time the head plate 2 is released from the backward restriction and advances to the play mode position (forward position).

When the mode plate 5 moves leftward, the cam follower 8a of the play link 8 slides leftward along substantially the W-like portion of the main cam 7 in the mode plate 5. Therefore, the play link 8 is turned in accordance with the configuration of the main cam 7. This turning force is transmitted through the spring 9a to the detect link 9 and FF/REW plate 27. More particularly, as shown in FIG. 3, when the mode plate 5 moves to the forward play mode position, the play link 8 turns clockwise and the FF/REW plate 27 turns leftward through the clockwise turning of the detect link 9.

When the mode switch (not shown) detects the arrival of the mode plate 5 to the forward play mode position, the moving motor 40 and, hence, the movement of the mode plate 5, stops to hold the mode plate 5 in a state where the play link 8 has arrived at the forward position.

At this time, by the clockwise turning of the detect link 9, the detect gear 10 meshes with the smaller diameter gear 34 of the reel base 11F. By the leftward movement of the FF/REW plate 27, the FF/REW gear 25F comes near the reel base 11F and flywheel 23F and the FF/REW gear 25R moves away from the reel base 11R and flywheel 23R.

However, in this case, since the base plate 2 is at the play mode position (progress position), the position of the FF/REW plate 27 is restricted by the control hole 30 in the head plate 2. More particularly, the control pin 43 of the FF/REW plate 27 abuts on the left-hand edge 33L of the rear end of the control hole 30 in the head plate 2 and the leftword movement of the FF/REW plate 27 is restricted by the left-hand edge Therefore, the FF/REW gear 25F stops only in the vicinity of the reel base 11F and flywheel 23F, and the smaller and larger diameter gears 41, 42 of the FF/REW gear 25F do not mesh with the larger diameter gears 35 and 39 of the reel base 11F and flywheel respectively.

In the stop mode, the pinch roller casings 12F, detained at the backward accommodation side releasing position by the head plate 2 turn forward or in the pressing direction in accordance with the progress of the head plate 2. Depending on the turning of the pinch roller casings 12F, 12R, the respective engagement pins 13a advance along the cam holes 28a in the idler plates 26F, 26R and the idler plates 26F, 26R turn inward.

When the change link 4 advances along with the head plate 2, as mentioned above, the engagement recess 4a in the change link 4 engages the first engagement portion 8b of the play link 8. Therefore, as shown in FIG. 3, when the play link 8 turns clockwise, its turning force is transmitted through its first engagement portion 8b and the engagement recess 4a in the change link 4 to the change link 4, which thus turns counterclockwise to arrive at the forward position. Following the turning of the change link 4, the left-hand engagement portion 4b of the change link 4 presses the engagement protrusion 12b of the pinch roller casing 12R backward against the action force of the pressing spring 14 to restrict the forward turning of the pinch roller casing 12R to hold the same at the standby side releasing position.

Following the restriction on the forward turning of such pinch roller casing 12R, the inward turning of the idler plate 26R is similarly restricted, so that the idler plate 26 is held at a given releasing position or at a position where the idler gear 24R attached to one end of the idler plate 26R is held spaced from the reel base 11R.

The pinch roller casing 12F on the forward side continues to be pressed forward by the action force of the pressing spring 14 and the pinch roller 13F is pressed against and held on the capstan 15F. In this case, the clearance L is provided between the engagement protrusion 12b of the pinch roller casing 12F and the cam hole 2a in the head plate 2, as described above, and the pinch roller casing 12F is not engaged with the head plate 2. Therefore, the action force of the pressing spring 14 is not uselessly applied to the head plate 2, but acts effectively as a force to press the pinch roller 13F of the pinch roller casing 12F against the capstan 15F to thereby sufficiently bring the pinch roller 13F sufficiently into contact with the capstan 15F.

The engagement pin 13a of the pinch roller 13F continues to advance along the cam hole 26a in the idler plate 26F, and the idler gear 24F provided on the idler plate 26F meshes with the larger diameter gear 35 of the reel base 11F. This causes the torque of the flywheel 23F to be transmitted through the idler gear 24F to the reel base 11F to thereby travel the tape in the forward play mode.

Reverse Play Mode (FIG. 4)

In the stop mode of FIG. 1, when the microcomputer gives a reverse play command, the moving motor 40 starts up to rotate the power gear 20 clockwise, and the mode plate 5 moves through the forward play mode position of FIG. 3 to the leftmost reverse position of FIG. 4. At this time, the action force of the pressing spring 14 acts as a drive force which drives the head plate 2 forward, so that the head plate 2 advances along the configuration of the cam 6. When the cam follower 2d of the head plate 2 moves away from the forward step FF of the cam 6 and completely from the cam 6, the head plate 2 is released from the backward restriction to advance to the play mode position (progress position).

By the leftward movement of the mode plate 5, the cam follower 8a of the play link 8 slides leftward along the substantially W-like main cam 7 in the mode plate 5. As shown in FIG. 4, when the mode plate 5 moves to the reverse play mode position, the play link 8 turns counterclockwise, so that the FF/REW plate 27 moves rightward through the counterclockwise turning of the detect link 9.

When the mode switch (not shown) detects the arrival of the mode plate 5 to the reverse mode position, the moving motor 40 stops to stop the movement of the mode plate 5, and, as shown in FIG. 4, the mode plate 5 is held when the play link 8 arrives at the reverse position.

At this time, by the counterclockwise turning of the detect link 9, the detect gear 10 meshes with the smaller diameter gear 34 of the reel base 11R. Depending on the rightward movement of the FF/REW plate 27, the FF/REW gear 25F approaches the reel base 11R and flywheel 23R and FF/REW gear 25F moves away from the reel base 11F and flywheel 23F.

However, in this case, since the head plate 2 is at the play mode position (progress position), the position of the FF/REW plate 27 is restricted by the control hole 30 in the head plate 2. That is, the control pin 43 of the FF/REW plate 27 abuts on the right-hand edge 33R of the rear end of the control hole 30 in the head plate 2, so that the rightward movement of the FF/REW plate 27 is restricted by the right-hand edge 33R. Therefore, the FF/REW gear 25R only approaches the reel base 11R and flywheel 23R, and the smaller diameter gear 41 and the larger diameter gear 42 of the FF/REW gear 25R do not mesh with the larger gears 33 and 39 of the reel base 11R side and flywheel 23F side, respectively.

As the head plate 2 advances, the pinch roller casings 12F, 12R detained by the head plate 2 at the backward accommodation side releasing position also turn forward or in the pressing direction. Therefore, the engagement pins 13a of the pinch roller casings 12F, 12R advance along the corresponding cam holes 28a in the idler plate 28F, 28R and the idler plates 28F, 28R turn inward.

When the head plate 2 advances along with the change link 4, as mentioned above, the engagement recess 4a in the change link 4 engages the first engagement portion 8b of the play link 8. Therefore, as shown in FIG. 4, when the play link 8 turns counterclockwise, its turning force is transmitted through the first engagement portion 8b and the engagement recess 4a in the change link 4 to the change link 4, which then turns clockwise to arrive at the reverse position. Depending on the turning of the change link 4, the right-hand engagement portion 4b of the change link 4 presses the engagement protrusion 12b of the pinch roller casing 12F backward against the action force of the pressing spring 14 to restrict the forward turning of the pinch roller casing 12F to hold the same at the standby side release position.

By such restriction to the forward turning of the pinch roller casing 12F, the inward turning of the idler plate 20F is similarly restricted, so that the idle plate 28F is held at a predetermined release position or at a position where the idler gear 24F attached to one end of the idler plate 28F is spaced from the reel base 11F.

The pinch roller casing 12R on the reverse side continues to be forced forward by the action force of the pressing spring 14 and the pinch roller 13R is pressed against and held by the capstan 15R. In this case, the clearance CL is provided between the engagement protrusion 12b of the pinch roller casing 12R and the cam hole 2 of the head plate 2, as mentioned above, and, hence, the pinch roller casing 12R does not engage the head plate 2. Therefore, the action force of the pressing spring 14 is not imparted uselessly to the head plate 2, but acts effectively as a force which presses the pinch roller 13R of the pinch roller casing 12R to the capstan 15R, to thereby bring the pinch roller 13R into sufficient contact with the capstan 15R.

By the advancement of the engagement pin 13a of the pinch roller 13R along the cam hole 26a, the idler plate 26R turns inward and the idler gear 24R meshes with the larger diameter gear 35 of the reel base 11R. Therefore, the torque of the flywheel 23R is transmitted through the idle gear 24R to the reel base 11R to thereby travel the tape in the reverse play mode.

Changing Between the Forward and Reverse Play Modes (from FIG. 3 to FIG. 4 and vice versa)

When the tape end appears in the forward or reverse play mode and the sensor senses the stop of the detect gear 10 due to the stop of the reel bases 11F, 11R, or when the operator inputs a command to change the direction of tape travel, the moving motor 40 starts up to move the mode plate 5 through the neutral position of FIG. 2, and the respective elements move to the opposite play mode position.

For example, when the microcomputer gives a reverse play command in the forward play mode of FIG. 3, the moving motor 40 further operates to turn the power gear 20 clockwise, and the mode plate 5 moves from the position of the forward play mode of FIG. 3 to the leftmost reverse play mode position of FIG. 4. At this time, the cam follower 2d of the head plate 2 continues to be retained at a position spaced from the forward step FF of the cam 6 since the cam follower was 2d in the forward play mode so that the head plate 2 continues to be held at the play mode position (progress position).

As the mode plate 5 moves to the reverse mode position, the play link 8 turns counterclockwise, as shown in FIG. 4, and the FF/REW plate 27 moves rightward through the detect link 9. As a result, the FF/REW gear 25R approaches the reel base 11R and the flywheel 23R, but the position of the FF/REW plate 27 is restricted by the control hole 30 in the head plate 2, so that it does not mesh with the reel base 11R and the flywheel 23R.

Since the change link 4 turns to the reverse position as the play link 8 turns counterclockwise, the right-hand engagement portion 4b of the change link 4 presses the engagement protrusion 12b of the pinch roller casing 12F backward to move the pinch roller casing 12F to the standby side releasing position. On the other hand, the pinch roller casing 12R is released from the change link 4, so that by the action force of the pressing spring 14, the pinch roller casing 12R is driven to the forward pressing position and the pinch roller 13R is pressed against and held on the capstan 15R. In accordance with the movement of the pinch roller 13R, the idler plate 26R is turned and the idler gear 24R is meshed with the reel base 11R. Thus, the torque of the flywheel 23R is transmitted through the idler gear 24R to the reel base 11R to thereby travel the tape in the reverse play mode, as shown in FIG. 4.

From Forward Play Mode to FF Mode (from FIG. 3 to FIG. 5)

When the microcomputer gives an FF command in the forward playing operation shown in FIG. 3, the moving motor 40 starts up to rotate the power gear 20 counterclockwise, and the mode plate 5 moves from the forward play position (FIG. 3) to the first FF/REW mode position of FIG. 5. At this time, the cam 6 of the mode plate 5 presses the cam follower 2d of the head plate 2 backward against the action force of the pressing spring 14 through the forward step FF to thereby cause the head plate 2 to regress to the FF/REW mode position.

In response to this regress of the head plate 2, the pinch roller casing 12F is turned from the pressing position to the standby side releasing position slightly after the pressing position to thereby release the pinch roller 13F from the capstan 15F. Simultaneously, the engagement pin 13a of the pinch roller casing 12F regresses along the cam hole 26a in the idler plate 26F, so that the idler plate 26F turns outward or clockward. Therefore, the idler gear 24F is released from the larger diameter gear 35 of the reel base 11F. Since the change link 4 is moved backward along with the head plate 2 with the change link 4 being held at the forward position in the counterclockwise direction, the engagement recess 4a in the change link 4 is disengaged from the first engagement portion 8b of the play link 8.

As the mode plate 5 moves to the first FF/REW mode position, the play link 8 turns clockwise as shown in FIG. 5, and the FF/REW plate 27 moves leftward through the clockwise turning of the detect link 9.

When the mode plate 5 arrives at the first FF/REW mode position, the mode switch (not shown) operates to stop the moving motor 40 and the power gear 20. Thus, the mode plate 5 is held at the first FF/REW mode position. In this case, since the detect link 9 has turned clockwise, the detect gear 10 has meshed with the smaller diameter gear 34 on the reel base 11F side.

As mentioned above, the FF/REW plate 27 moves leftward in accordance with the turning of the detect link 9, in which case the head plate 2 is at the FF/REW mode position, so that the FF/REW plate 27 is released from the head plate 2 to be movable further leftward than in the forward play mode. More particularly, the control pin 43 of the FF/REW plate 27, which has abutted on the left-side edge 33L of the rear edge 33 of the head plate 2 in the forward play mode, moves to the left-side edge 32L side of the central portion 32 of the control hole 30 in the head plate 2 in accordance with the regress of the head plate 2 to the FF/REW mode position. Therefore, the FF/REW plate 27 smoothly moves more leftward than in the forward play mode. The FF/REW plate 27 stops its movement when the smaller and larger diameter gears 41 and 42 of the FF/REW gear 25F mesh with the larger diameter gears 35 and 39 of the reel base 11F and flywheel 23F sides, respectively. Thus, the torque of the flywheel 23F is transmitted through the FF/REW gear 25F to the reel base 11F to thereby travel the tape in the forward side FF mode.

REW Mode from the Forward Play Mode (from FIG. 3 to FIG. 6)

When the microcomputer gives a REW command in the forward play mode shown in FIG. 3, the moving motor 40 starts up to turn the power gear 20 counterclockwise, and the mode plate 5 moves from the forward play position (FIG. 3) to the left-hand second FF/REW mode position of FIG. 6. At this time, the cam 6 of the mode plate 5 pushes the cam follower 2d backward against the action force of the pressing spring 14 through the forward step portion FF to cause the head plate 2 to regress to the FF/REW mode position.

Depending on the regress of the head plate 2, the pinch roller casing 12F turns from the pressing position to the standby side releasing position somewhat behind the pressing position to thereby release the pinch roller 13F from the capstan 15F. Simultaneously, the engagement pin 13a of the pinch roller casing 12F moves backward along the cam hole 26a in the idler plate 26F and the idler plate 26F turns outward. Therefore, the idler gear 24F is released from the larger diameter gear 35 of the release base 11F. The change link 4 moves backward along with the head plate 2 and the engagement recess 4a in the change link 4 is disengaged away from the first engagement portion 8b of the play link 8.

As the mode plate 5 moves to the second FF/REW mode position, the play link 8 turns counterclockwise, as shown in FIG. 6, so that the FF/REW plate 27 moves rightward through the counterclockwise turning of the detect link 9.

When the mode plate 5 has arrived at the second FF/REW mode position, the mode switch (not shown) operates to stop the moving motor 40 and the power gear 20. Thus, the mode plate 5 is held at the second FF/REW mode position. In this case, since the detect link 9 has been turned counterclockwise, the detect gear 10 meshes with the smaller diameter gear 34 of the reel base 11R.

While as mentioned above, the FF/REW plate 27 moves rightward in accordance with the turning of the detect link 9, the FF/REW plate 27 is released from the head plate 2 and is movable more rightward than in the reverse play mode because the head plate 2 is at the FF/REW mode position. As the head plate 2 moves backward to the FF/REW mode position, the control pin 43 of the FF/REW plate 27 moves to the right-hand edge 32R side of the central portion 32 of the control hole 30 in the head plate 2. Therefore, the FF/REW plate 27 moves smoothly more rightward than in the reverse mode. When the smaller and larger gears 41 and 42 of the FF/REW gear 25 meshes with the larger diameter gears 35 and 39 of the reel base 11R side and the flywheel 23R, resepectively, the FF/REW plate 27 stops. Thus, the torque of the flywheel 23R is transmitted to the reel base 11R through the FF/REW gear 25R to thereby travel the tape in the forward side REW mode.

FF/REW Mode Changing (from FIG. 5 to FIG. 6 and vice versa)

When the mode is changed from the forward side FF mode of FIG. 5 to the forward side REW mode of FIG. 6, the moving motor 40 starts up to move the mode plate 5 to thereby move the respective members to the opposite FF/REW mode position.

For example, when the microcomputer gives a REW mode command in the FF mode of FIG. 5, the moving motor 40 further operates to rotate the power gear 20 clockwise and the mode plate 5 moves from the first FF/REW mode position of FIG. 5 to the second FF/REW mode position of FIG. 6. At this time, since the cam follower 2d of the head plate 2 continues to be kept on the forward step FF of the cam 6 even in the REW mode subsequent to the FF mode, the head plate 2 continues to be held at the FF/REW mode position. Therefore, both the pinch roller casings 12F, 12R continue to be held at the standby side releasing position. As a result, both the idler plates 26F, 26R continue to be held outside, so that the idler gears 24F, 24R continue to be held at a position remote from the reel bases 11F, 11R even in the REW mode subsequent to the FF mode. Since the change link 4 has been moved backward along with the head plate 2, the engagement recess 4a in the change link 4 is remote from the first engagement portion 8b of the play link 8, and that the change link 4 is at the neutral position.

As the mode plate 5 moves to the second FF/REW mode position, the play link 8 turns counterclockwise, as shown in FIG. 6, so that the FF/REW plate 27 turns clockwise through the detect link 9. In this case, since the head plate 2 is at the FF/REW mode position, the FF/REW plate 27 is released from the head plate 2 while the FF/REW gear 25R meshes with the reel base 11R and the flywheel 23R. Thus, tape travel is performed in the forward side REW mode.

From Reverse Play Mode to FF/REW Mode

When the mode is changed from the reverse play mode to the FF mode, a shift operation similar to that in the REW mode in the forward play is performed (not shown). That is, the mode plate 5 moves to the second FF/REW mode position. Depending on the counter-clockwise turning of the play link 8, the FF/REW plate 27 moves rightward, the smaller diameter gear 41 and larger diameter gear 42 of the FF/REW gear 25R mesh with the larger diameter gears 35 and 39 of the reel base 11R side and the flywheel 23R side, respectively, to travel the tape in the reverse side FF mode.

In contrast, when the mode is changed from the reverse play mode to the REW mode, a shift operation similar to that performed in the FF mode in the forward play operation is performed. That is, the mode plate 5 is moved to the first FF/REW mode position. Depending on the clockwise turning of the play link 8, the FF/REW plate 27 moves leftward, the smaller gear 41 and the larger gear 42 of the FF/REW gear 25F mesh with the larger diameter gears 35 and 39 of the reel base 11F side and the flywheel 23F side, respectively, to travel the tape in the reverse side REW mode.

Return to Stop Mode

In order to return to the stop state of FIG. 1 from the aforementioned forward mode and the reverse play mode or the FF/REW mode, the mode plate 5 is moved rightward and the head plate 2 is forcedly moved backward against the action force of the pressing spring 14 by the action of the cam 6. Depending on such operation of the head plate 2, both the pinch roller casings 12F, 12R are forcedly moved backward through the engagement of the cam hole 2a and the engagement protrusion 12b.

Effect of the Tape Travel Control Mechanism

As mentioned above, according to the tape travel control mechanism of the present embodiment, the single mode plate 5 can position the head plate 2 and perform the pressing, releasing and changing operation of the pinch rollers 13F, 13R relative to the capstans 15F, 15R. In addition, it can also control the engaging, disengaging and changing operations of the FF/REW gear. In addition, by the mode plate 5, the engaging, disengaging and changing operations of the play mode of the idler gears 24F, 24R can be controlled. Such various tape travel control operations can be performed easily and securely with a very simple structure which uses the small number of intermediate members such as the play link 8, change link 4, detect link 9 and FF/REW plate 27.

Therefore, according to the inventive control system, the number of parts is reduced and the overall mechanism is simplified compared to the conventional techniques, which use the solenoid and the intermittent gear. As a result, assembly is easy and the accuracy of assembly is improved, so that the reliability of the tape travel control mechanism is improved. A reduction in the number of parts and the simplification of the mechanism improves the degree of freedom of design in the tape recorders, contribute to reduction of the size, weight of the overall tape player, and cost and provides high practicality.

Other Embodiments

The present invention is not limited to the above embodiments. For example, the means for detecting the mode change is not limited to a detect gear, a sensor and a mode switch, but other elements may be used freely. While in the above embodiments the single mode plate is illustrated as performing the changing of the pinch rollers, the changing of the first feed and rewinding operations, and the changing of the idler gears, arrangement may be such that changing any one kind of tape travel means or any selected two kinds of tape travel means is performed. The specified structures of the elements used may be changed as required and the structures of the peripheral elements may also be changed as desired.

In addition, those skilled in the art to which the present invention belongs could provide various changes and modifications in accordance with the spirit and features of the present invention without departing from the scope of the present invention defined in the attached claims. Thus, those changes and modifications should be included in the present invention.

What is claimed is:

1. A tape travel control mechanism which feeds a magnetic tape in a forward direction or in a reverse direction in a selectively changeable manner, comprising:

a fixed member;

a head plate disposed movably over said fixed member for moving between a first and a second operational position;

a head mounted over said head plate for contacting the tape when said head plate is at the first operational position while said head is positioned away from the tape when said head plate is at the second operational position;

forward side tape travelling means and reverse side tape travelling means disposed operably over said fixed member for performing tape travel in the forward direction and in the reverse direction, respectively;

a change member movably positioned on said fixed member for moving between a forward and a reverse position to render operable said forward side tape travelling means at the forward position and to render operable said reverse side tape travelling means at the reverse position;

a link member movably positioned over said fixed member for moving between a forward and a reverse position and engaging said change member to move the same to a corresponding one of the forward and reverse positions and to hold the change member at that position;

a detect link movably positioned on said fixed member;

a detect gear being rotatably mounted on the detect link;

means for connecting the detect link to the link member for movement therewith;

a mode plate movably positioned over said fixed member for moving between a plurality of operational positions for controlling the positions of said head plate and said link member, said mode plate having a first cam section at one end for engaging said head plate in accordance with its movement between said plurality of operational positions to control the positions of said head plate, a second elongated cam for engaging said link member to control the position of said link member and a rack on the mode plate; and means for driving said mode plate by engagement with said rack, the plurality of operational positions of said mode plate comprising an operational position where said first control section holds said head plate at the first operational position and another operational position where said first control section holds said head plate at the second operational position.

2. A tape travel control mechanism according to claim 1 wherein said head plate has an L-shaped configuration.

3. A tape travel control mechanism according to claim 2 wherein said head plate includes a first and second leg portion and wherein said change member is approximately parallel to one of said first and second leg portion.

4. A tape travel control mechanism according to claim 3 wherein said link member is approximately parallel to one of said first and second leg portion.

* * * * *